INVENTOR.
BILLIE G. SCHWACHA

May 23, 1961  B. G. SCHWACHA  2,985,050
LIQUID CUTTING OF HARD MATERIALS
Filed Oct. 13, 1958  4 Sheets-Sheet 3

INVENTOR.
BILLIE G. SCHWACHA
BY
Charles F. Dieckler
ATTORNEY

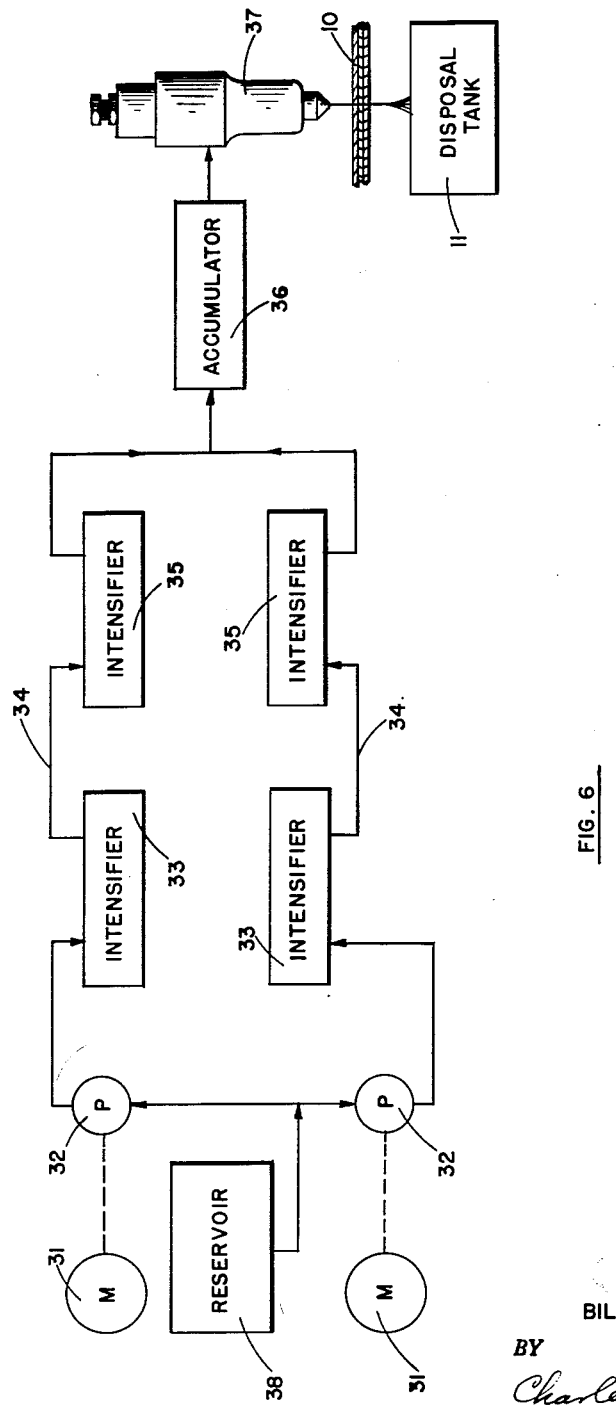

United States Patent Office 2,985,050
Patented May 23, 1961

2,985,050

LIQUID CUTTING OF HARD MATERIALS

Billie G. Schwacha, Anaheim, Calif., assignor to North American Aviation, Inc.

Filed Oct. 13, 1958, Ser. No. 766,952

12 Claims. (Cl. 83—53)

This application relates to the metal cutting art generally, and in particular it relates to liquid cutting of hard, high-strength, resistant materials.

Metal cutting methods and apparatus presently being utilized throughout the metal working industries have failed to parallel current advances in the field of metallurgy. Many new alloys have recently come into prominence in fulfillment of the requirement of high strength at high temperatures. Examples of these metals include precipitation-hardening stainless steels, such as the chromium-nickel-molybdenum stainless steels designated as AM–350 and AM–355 and the austenitic iron-nickel-chromium steel designated A–286, all as manufactured by Allegheny Ludlum Steel Corporation. Other examples include: PH15–7Mo and 17–7PH stainless steels, which are precipitation-hardening, chromium-nickel stainless steels manufactured by Armco Steel Corporation; Thermold J, an air-hardenable alloy manufactured by the Universal Cyclops Steel Corporation; various Inconel alloys which are nickel-chromium-iron alloys manufactured by the International Nickel Company; pure titanium and titanium alloys; and high strength alloy steels such as SAE 4130. In their fully heat treated condition, these metals may have hardnesses ranging as high or higher than a Rockwell C number of 60, depending on the type of heat treatment to which they have been subjected. Representative of the properties of these materials is the 200,000 p.s.i. yield strength, 225,000 p.s.i. ultimate strength, and 150,000 p.s.i. ultimate shear strength of the PH15–7Mo alloy.

Due to the extreme hardness and strength of these alloys, the conventional methods of forming and cutting, such as nibbling, routing, sawing, grinding, and the like, have become extremely time-consuming, difficult and expensive, with no one such method being solely capable of satisfactorily producing a finished production part by itself.

The present invention provides a new, fast and economical arrangement for shearing such super-tough alloys and other hard materials by the application of hypersonic jets or thrusts of a liquid through the material. These jets may be comprised solely of a liquid or may include an abrasive material borne by the liquid jet stream to facilitate and increase the cutting action of the liquid jet.

Accordingly, it is an object of this invention to provide a method and apparatus for cutting extremely hard, high-strength, resistant materials by means of a liquid jet.

It is also an object of this invention to provide a means for economically and rapidly shearing and cutting high-strength metal alloys.

It is a further object of this invention to provide an arrangement for shearing and cutting high-strength alloys wherein a greater thickness or depth of alloy can be cut than by conventional methods and apparatus. Such an arrangement allows a maximum number of stacked sheets or a thicker single plate to be cut in the same time as heretofore required for a lesser number of stacked sheets or a thinner plate. Conversely, for an equal thickness of cut the rate of shearing is greatly increased.

It is a still further object to provide a means of cutting hard, high-strength materials that leaves a smooth surface finish on the faces of the cut members.

It is yet another object of this invention to provide an arrangement for accurately and closely cutting hard, high-strength alloys to a predetermined contour, wherein the arrangement lends itself to use with a tracer head to produce a workpiece having a superior finish requiring no further finishing or grinding operations such as is required with conventional shearing, nibbling and sawing operations.

These and other objects and advantages of the present invention will become apparent to those skilled in the art after reading the present specification and the accompanying drawings forming a part thereof, in which:

Fig. 6 is a schematic drawing of a modified cutting system for maintaining a substantially continuous jet discharge at higher pressures than can be attained with the systems of Figs. 1 and 2.

Figure 1:
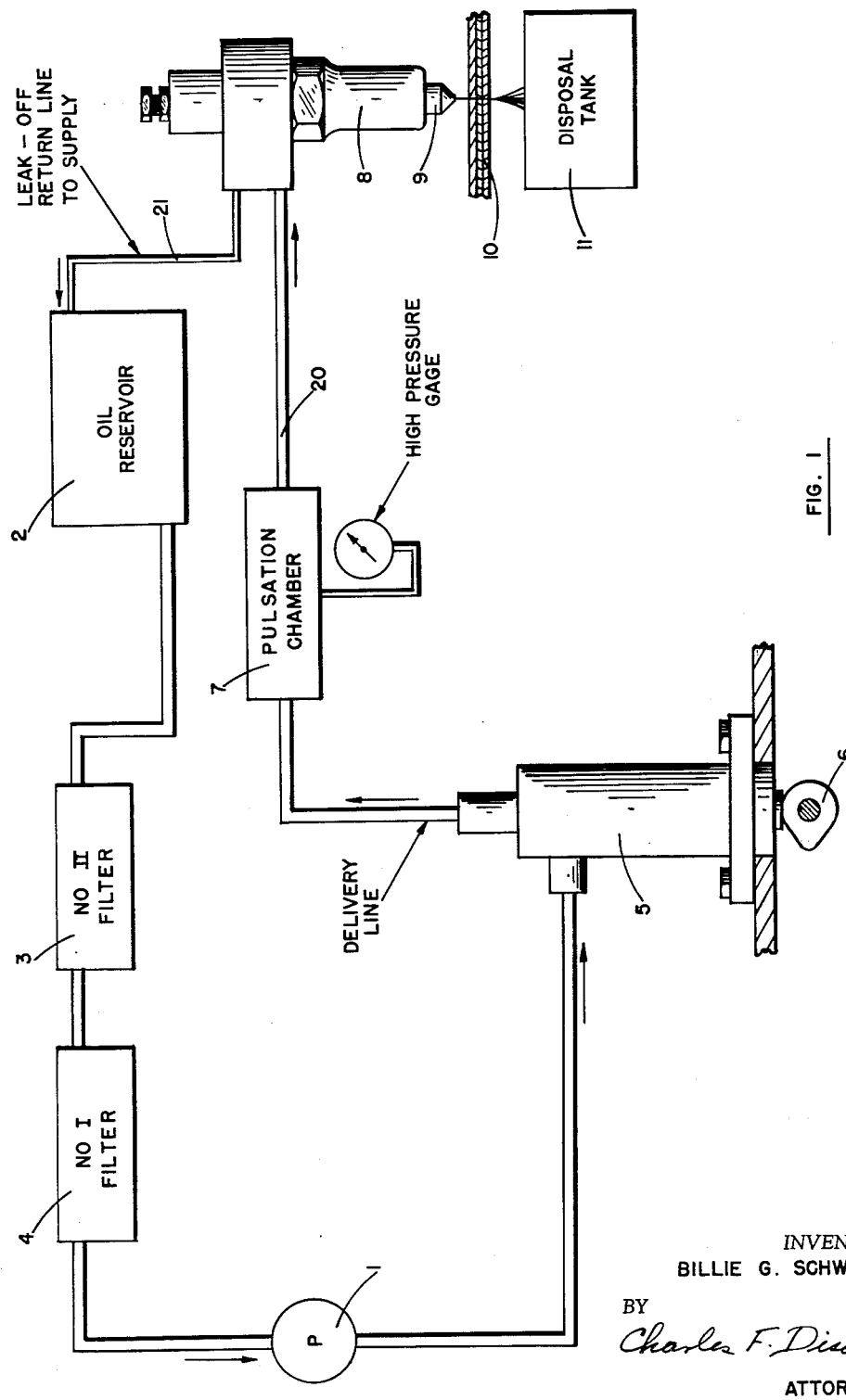
Fig. 1 is a schematic drawing of a liquid cutting system for practicing the present invention.

The liquid cutting process herein set forth depends for its operation upon pressurization of the cutting fluid to extremely high values and its subsequent release through a small orifice or nozzle to produce a jet of fluid that is directed against the workpiece at great velocity. The extremely high pressures involved produce a jet having a velocity that is many times the speed of sound and, as such, can be truly termed hypersonic.

The cutting jet may be either of a continuous or substantially continuous nature or it may be of a pulsating or intermittent type. With initially available equipment the fluid jet utilized in the practice of this invention was of a pulsating or intermittent type wherein short-time-duration jets were projected at high speed intervals.

While the cutting fluid jets may consist solely of fluid or may also contain abrasive material, the concept of this process, rather than being solely that of an eroding or wearing away as in a conventional abrasion process, may be compared to the action of a structurally weak element being thrust through a hard, resistant, strong element without deformation of the weak element when the latter is acted on by extremely sudden and powerful forces. For instance, the example of a straw being thrust through wood during a tornado without deformation of either the straw or the wood furnishes an insight into the manner in which the present method functions. The greatest efficiency of the present process is attained when it is utilized on hard materials. The greater the material strength and hardness and the higher the material elasticity, the greater the resistance to deformation and absorption of the forces of a suddenly applied shock load. Such materials, therefore, tend to be pierced by the high energy thrusts of the oil jets instead of absorbing such energy by elastomeric deflection. For this reason, rubber and other resilient materials having a high degree of elasticity do not lend themselves to being cut by the present method and, as such, they form valuable means for controlling and shielding the high pressure jets which otherwise might be dangerous to the operators. However, while hard materials present the greatest opportunity for optimum use of this invention with maximum efficiency, it has also been demonstrated that relatively limp, soft materials can also be cut efficaciously.

The ultimate shearing strength of a 17–7PH stainless steel is 140,000 p.s.i. To cut a 0.006" diameter hole in 17–7PH stainless steel plate having a thickness of 0.060" requires 9.60 inch-pounds of energy. Utilizing a working fluid under a pressure of 100,000 p.s.i. and projected through a 0.006" diameter nozzle at a velocity of 4000 feet per second, the jet energy amounts to 2400 inch-pounds per second. The energy ratio is, therefore, 240 to 1. This indicates that the jet contains sufficient energy to pierce 240 stacked sheets of 0.060" 17–7PH stainless steel. The forces attainable by means of hypersonic jet thrusts of oil under a pressure of 100,000 p.s.i. are calculable as being approximately 28 times greater than those that can be applied by presently used types of equipment.

The optimum qualities required for a suitable cutting fluid include zero or minimum moisture content, strongly bonded molecular structure, good lubricity characteristics, and a relatively low viscosity at extremely high pressures. Additionally, the fluid should have a low corrosive action on the closely-fitted components of the pump and cutting mechanism and, for safety, it must have a low toxicity and good flammability characteristics. While a number of suitable liquids are available on the market, an additive is usually necessary to achieve the required results and attain a favorable life expectancy of the cutting unit. In general, non-chlorinated petroleum oils have been found preferable for this use, however alcohol as well as a mixture of glycerine and water also present desirable properties for use as a high pressure cutting fluid.

Non-exclusive examples of fluids that have been successfully utilized include blended oils produced by Phillips Petroleum Corp. and designated as Phil-Oil Nos. 1001 to 1014. These oils have a viscosity range of 0.87 to 11.2 centistokes at 100° F. and can be blended to give intermediate desirable gravities and viscosities. It should be emphasized that the viscosity characteristics of the fluid at the extremely high pressures of this invention must not be too high or the fluid solidifies to a slushy or plastic consistency under pressure with consequent damage to the equipment.

The oil consumed by a jet emitted from a nozzle having a diameter of 0.006" for six hours of operation by a reciprocating pump having an output of 300 strokes per minute amounts to a mere 2.23 gallons in six hours of operation. If an abrasive is utilized in the process, no effort is, therefore, made to recover this small volume of working fluid.

While the jets may solely utilize a liquid, it has been found desirable in some applications to provide an abrasive to be picked up by the liquid jet stream and projected against the workpiece to increase the cutting action. Aluminum oxide has been found to be well suited as such an abrasive with an optimum grit size of #120, which corresponds to an average diameter of 102 microns. A modified type of aluminum oxide designated "aluminum oxide fast blast," designed to eliminate flats and slivers in the granule structure, is superior to the ordinary aluminum oxide. With "fast blast" a #240 grit size appears to be the optimum for cutting usage. Boron carbide, in granular and powdered form and ranging from a grit size of #8 to #800, may also be used as the abrasive material. Silicon carbides present a still further possibility; however, they are of a sliver-type granule, whereas the aluminum oxides are generally of a cubical-type granule and thus more desirable. Boron carbide in a fine optical #800 grit has been found to have optimum effectiveness under most conditions. The abrasive may be suspended and introduced into the jet by means of a light oil vehicle such as olive oil, kerosene, mineral oil diluted with kerosene, or light machine oil, or it may be air-borne into proximity with the fluid jet by an auxiliary pneumatic abrasive carrier system.

Nozzle orifice diameters ranging from 0.021 inch down to 0.0025 inch have been tested for their cutting action, with the optimum orifice diameter being in the range from 0.008 inch to 0.0025 inch or less. With presently available pumping equipment of a modified diesel-pump type, the smaller diameter orifices below 0.0065 inch resulted in approximately 20% slippage of the cutting fluid past the barrel and plunger of the pump assembly. With a 0.0065" diameter nozzle orifice, however, this slippage was reduced to 7%, with a jet velocity of approximately 6700 feet per second. Under the conditions utilized therein with a pump stroke of 300 strokes per minute and a delivery of 1.35 cubic centimeters per stroke, the nozzle orifice of 0.0065" produces the optimum cutting results.

Referring now specifically to the drawings, wherein like reference characters have been used throughout the several views to designate like parts and referring at first to Fig. 1, a hydraulic system for providing pulsating or intermittent cutting fluid jets is illustrated. The cutting fluid is drawn from a supply reservoir 2 through filters 3 and 4 by means of a positive displacement pump 1. This pump supplies the cutting fluid to the high pressure pump unit 5 at a pressure of approximately 20 pounds per square inch. High pressure pump 5 is a standard diesel fuel pump modified in certain design aspects to better accomplish its intended function and reciprocably driven by a suitable power means through cam 6. With cam 6 revolving at a speed of 1800 r.p.m., the pump delivers fluid into delivery line 20 at a rate of 30 positive pressure strokes per second. Interposed between the pump 5 and ejection unit 8 is a pulsation damping chamber 7. The pulsation chamber is incorporated into the pressure line to absorb pressure fluctuations and prevent possible damage to both the pump valve and the plunger unit from the shock impulses.

Ejection unit 8 is a standard diesel fuel injection unit, also suitably modified, having a spring tension adjustment for setting the valve discharge pressure and an internal by-pass for return and recirculation of unused fluid. The cutting fluid is ejected through nozzle 9 which contains an orifice dimensioned and correlated to the pumping system to achieve the optimum required depth, width and speed of cut. The dispersion pattern of the jet, as measured by the included angle between opposed surface elements of the elongated conical jet, also may have some bearing on the maximum allowable depth of cut. It has been found that with an orifice diameter of 0.013 inch a usable jet in excess of five and one-half inches in length may be produced at a pressure of approximately 100,000 p.s.i.

The work 10, to be cut by the jet, is placed in close proximity to the end of the nozzle and substantially normal thereto. It has been found that for optimum cutting conditions the work should, in general, be not more than three-eighths of an inch from the tip of the nozzle.

Since the cutting jet, after passing through the metal, is moving at a high velocity and contains a considerable amount of energy, it is generally necessary to control the jet and render it harmless by the provision of a disposal tank 11 incorporating a cushioning substance such as Fiberglas, rubber blankets, liquid, and the like.

Figure 2:
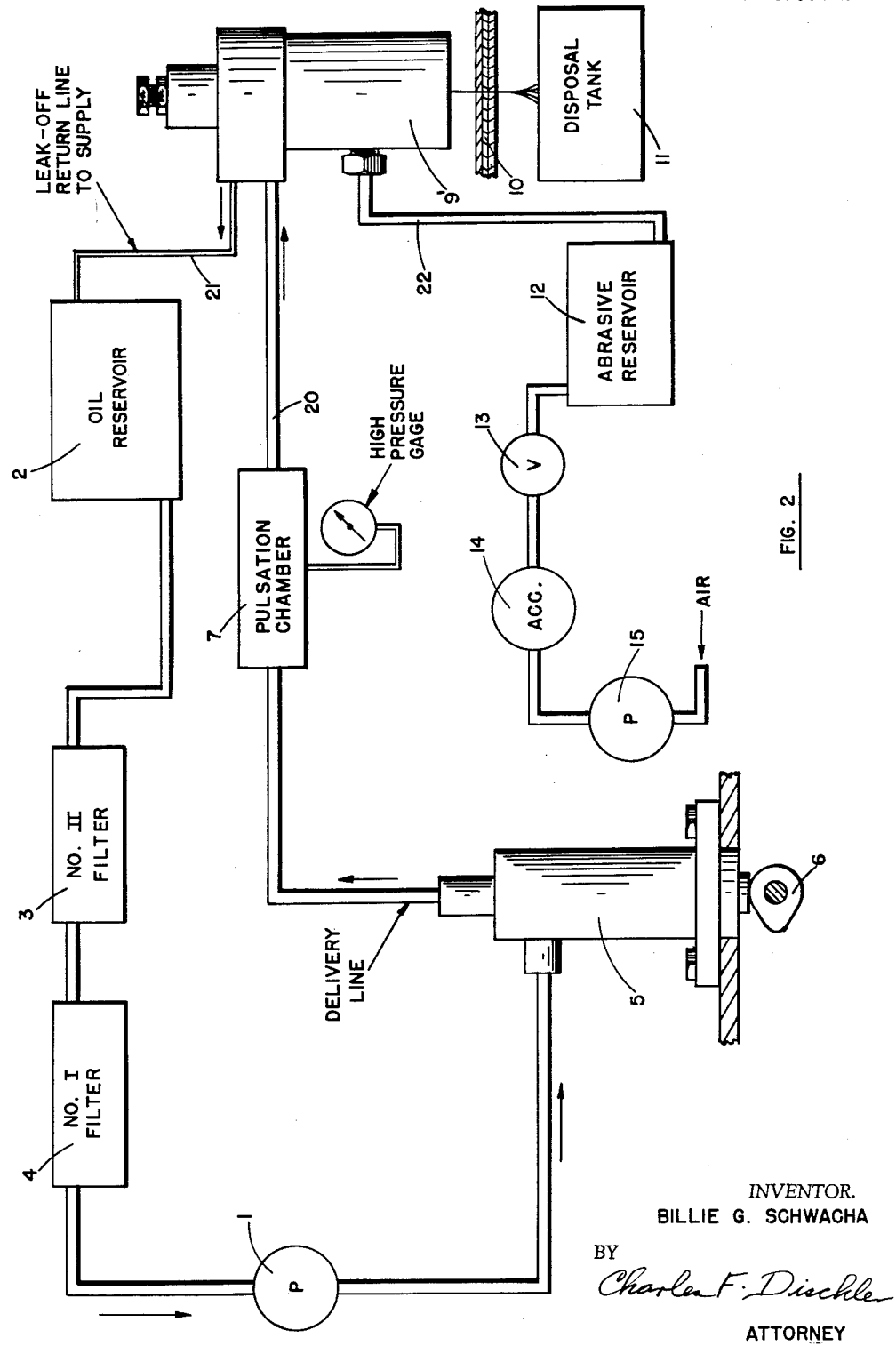
Fig. 2 is a schematic drawing of the liquid cutting system of my invention utilizing an abrasive in conjunction with the liquid.
Figure 3:
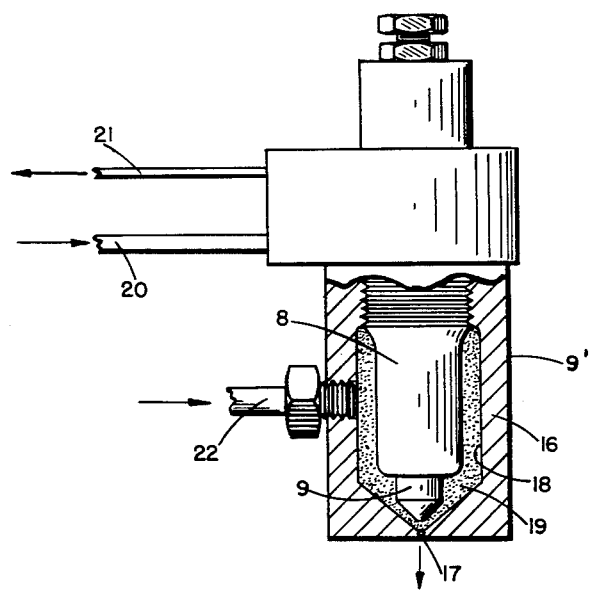
Fig. 3 is an enlarged elevational view, partly in section, of the ejection nozzle of the liquid-abrasive system of Fig. 2 showing one arrangement whereby abrasive is picked up by the liquid jet.

Fig. 2 shows essentially the same system as illustrated in Fig. 1, with the addition of an auxiliary abrasive system whereby an abrasive material may be fed to the jet stream, picked up thereby and borne therewith against the workpiece 10. As shown in this figure, a pump 15 supplies pressurized air to accumulator 14. Valve 13, in turn, controls the flow of this air through an abrasive reservoir 12, wherein the air picks up the abrasive material and carries it through abrasive feed line 22 into the abrasive feed nozzle assembly 9'. Fig 3 is an enlarged view of the injector unit of Fig. 2 showing the injector 8 positioned within body 16 and forming therebetween an abrasive chamber 18. The body 16 has an orifice 17 at its lower end coaxial with the nozzle orifice. As the fluid jet passes through the lower end of the chamber 18, it picks up abrasive particles 19 and projects them against the workpiece.

Figure 4:
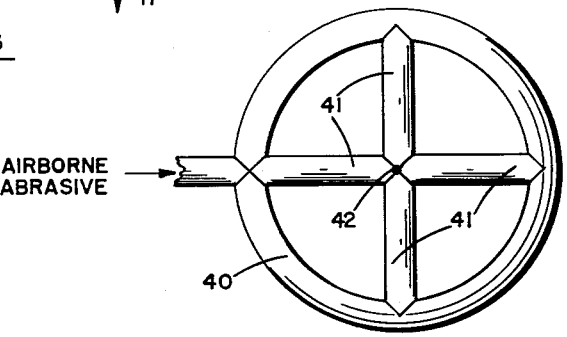
Fig. 4 is an enlarged plan view of another arrangement for feeding abrasive to the liquid jet.

Another suitable arrangement for supplying the abrasive to the liquid jet stream is shown in Fig. 4. In this arrangement the airborne abrasive is fed into a stainless steel hollow toroidal ring 40 having four hollow radially extending arms 41 intersecting at the center of the ring 40. At this intersection center a small aperture 42 is formed to allow the fluid jet to be projected therethrough when ring 40 is placed in aligned proximity to the nozzle orifice. The airborne abrasive is thus conveyed to the jet, for pickup thereby, by means of the hollow ring 40 and hollow connecting tubes 41.

While Figs. 2, 3 and 4 illustrate forms of a pneumatic-type abrasive feed system, such systems tend to produce considerable free airborne abrasive dust in the vicinity of the operator. For this reason it may be preferable in some installations to introduce the abrasive by means of a liquid carrier agent. Such a liquid carrier may be suitably agitated by air or other means to prevent settling of the abrasive within the nozzle assembly 9'.

Figure 5:
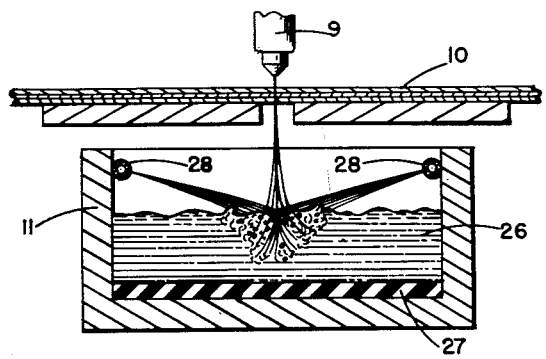
Fig. 5 is a perspective view of a catch tank for absorbing the unspent energy of the jet with means for controlling and preventing the dispersion of cutting oil vapors in the work area.

At the extremely high pressures utilized in this invention it becomes necessary to find a means for absorption of the energy remaining in the fluid after cutting of the workpiece. Fig. 5 illustrates one solution to this problem. Catch tank 11 contains water or other fluid 26 above a resilient pad 27 of rubber or neoprene or a similar elastomeric material. Spray rails 28 are provided on each side of the tank 25 with a water spray being directed downwardly over the liquid surface to blanket the cutting oil vapors and prevent their dispersal in the area of the cutting machine. If desired, the abrasive material may be recovered from the catch tank by a suitable settling arrangement. The cutting fluid should not be re-used, however, to prevent abrasion of the system components.

While the high pressure pump and the ejector unit of this assembly, as shown in Figs. 1 and 2, were adapted from standard diesel fuel pump and injection units and deliver a pulsating or intermittent jet of high frequency that is highly effective for cutting purposes, by the provision of a continuous delivery high pressure pump or an accumulator it is possible to provide a continuous jet flow operation. The cutting action provided by a continuously discharging jet is preferable since intermittent jet pulses tend to produce a somewhat irregular material surface, or stitching effect, due to the intermittent repeated cutting action.

Fig. 6 illustrates a system for providing a substantially continuous jet. This arrangement comprises identical dual hydraulic systems supplying pressurized cutting fluid to a manifold which, in turn, supplies the fluid to the cutting nozzle. As shown therein, motors 31 drive positive displacement pumps 32 supplying hydraulic fluid from reservoir 38 by a suitable conduit system, at several thousand p.s.i., to the drive end of medium pressure system intensifiers 33. Since an intensifier is essentially but a tandem piston arrangement wherein the diameter ratio of the drive piston to driven piston is substantially greater than unity, an output pressure greater than the input pressure is obtained at the expense of a reduction in flow volume. Such intensifiers are readily available commercially. Fluid from the driven end of the medium pressure intensifier 33 is supplied by conduit 34 to the drive end of a second or high pressure intensifier 35. The cutting fluid will be discharged from the driven end of intensifier 35 into accumulator 36 and then is projected through nozzle 37 against the work. The valving for automatically directing the fluids to either side of the intensifier pistons for causing reciprocation is a matter of standard hydraulic design and has not been illustrated in the schematic of Fig. 6. The parameters of this system include a final cutting fluid pressure of 200,000 p.s.i. with an overall intensification ratio of 115:1 and a volume delivery of ½ pint of cutting fluid per minute, with the pumping strokes of the individual systems being out of phase to provide a substantially constant, non-pulsating delivery of cutting fluid. The cutting nozzle 37 is preferably of stainless steel with a suitably dimensioned orifice drilled in a diamond or sapphire insert. While Fig. 6 does not illustrate an abrasive type nozzle of the type shown in Fig. 3, such a nozzle may optionally be employed with the abrasive being carried by a liquid carrier under a pressure of from about 20 to 60 p.s.i.

While the cutting fluid pressures, as set forth above, have thus far been in the range from 100,000 p.s.i. to 200,000 p.s.i., the concept of liquid cutting imposes no limitations on the maximum useful pressure. In general, the greater the pressure, the greater the cutting speed attainable and the greater the thickness of the material that can be cut. The effective pressures are only limited by the ability of the equipment to operate satisfactorily for carrying out the cutting process.

Liquid cutting produces a smooth finish on the cut edges of the workpiece, a finish of approximately 40 micro inches being easily attainable by this process. For ordinary work, this, therefore, makes it unnecessary to perform further finishing operations such as grinding or honing.

The system of this invention is readily adaptable by reason of its flexibility to use with an automatic tracer head whereby exact contours may be reproduced directly to finished size and with the desired surface finish. This feature gives the liquid cutting process a considerable economic advantage over ordinary types of cutting and finishing methods.

The present invention has been described in relation to the cutting of metals but it is equally applicable to the cutting of non-metallic materials such as the new quartz and glass bonded laminates presently coming into use. Some of these materials have even higher strength characteristics than the alloys previously mentioned.

While particular embodiments of this invention have been illustrated and described herein, it will be apparent that various changes and modifications may be made in the construction and arrangements of the various parts without departing from the spirit and scope of this invention in its broader aspects, or as defined in the following claims.

I claim:

1. The method of cutting a hard material by means of a supersonic jet of liquid comprising supplying a working liquid pressurized to thousands of atmospheres of pressure and a discharge nozzle having an orifice diameter no greater than twenty thousandths of an inch to eject the liquid in a fine needle-like jet at supersonic velocity; positioning the material in proximity to the discharge end of said nozzle; and applying a supersonic jet of liquid at a velocity of at least 4,000 ft. per second from said nozzle substantially normally against said material to remove a portion of the same in proximity to the discharge nozzle to thereby form an opening in said material.

2. An apparatus for cutting a hard material comprising a cutting fluid adapted to be pressurized and ejected at supersonic velocity against the said hard material; a means for pressurizing said cutting fluid to a pressure of thousands of atmospheres wherein the cutting fluid has a fluid energy substantially greater than that required to cut such a hard material; and means for releasing and directing said cutting fluid in a fine, needle-like jet directed substantially normally and at supersonic velocity against the hard material to rapidly substantially instantaneously cut the same.

3. An apparatus for cutting hard material comprising a cutting fluid adapted to be pressurized and ejected at supersonic velocity against the hard material; a means for pressurizing said cutting fluid to a pressure of thousands of atmospheres wherein the cutting fluid has a fluid energy substantially greater than that required to shear such a hard material; means for releasing and directing said cutting fluid in a fine, needle-like jet at supersonic velocity substantially normally against the hard material; and means for introducing abrasive particles into said jet to increase the cutting action of the same whereby said hard material may be substantially instantaneously sheared fully through.

4. The method of shearing materials substantially instantaneously by means of a fluid jet issuing from a nozzle at ultrasonic velocity comprising positioning the material in proximity to the discharge end of the nozzle; providing a thin, needle-like jet of fluid issuing from the nozzle substantially normally against the material with a fluid energy, measured in inch pounds per second, substantially in excess of that required to shear the material whereby said fluid jet substantially instantaneously shears through the material.

5. The method of cutting hard material by means of a supersonic jet of liquid comprising positioning the hard material in proximity to the discharge end of a nozzle; discharging liquid from said nozzle intermittently in pulsating, needle-like jets which issue from said nozzle at supersonic velocity; impinging said supersonic jets substantially normally against the material to remove a portion of the material in proximity to the discharge nozzle to substantially instantaneously shear completely through the material.

6. The method of cutting a material by means of a supersonic jet of liquid comprising positioning the material to be cut with a surface in proximity to a cutting nozzle having a discharge orifice diameter in the range of from two to twenty thousandths of an inch; pressurizing a liquid to at least 50,000 pounds per square inch; discharging said liquid from said nozzle substantially normally against the material in a thin, needle-like jet having a fluid energy substantially in excess of that required to shear the material whereby said liquid jet substantially instantaneously shears through said material; and providing relative movement between said material and said liquid jet to form an elongated opening in said material.

7. The method of cutting a hard material by means of a supersonic jet of liquid comprising providing a supply of lubricating cutting liquid pressurized to provide a supersonic discharge of the liquid from a nozzle in a fine stream with a fluid energy substantially in excess of that required to shear the hard material; positioning the material to be cut in proximity to the cutting nozzle; introducing an abrasive into said liquid jet before discharge from said nozzle; and applying said supersonic fine stream jet of cutting liquid substantially normally against the material surface to substantitally instantaneously remove a portion of the material in proximity to the discharge nozzle whereby said liquid jet substantially instantaneously shears through said material.

8. The method of cutting hard materials by means of a hypersonic jet of oil comprising pressurizing oil to a pressure of at least several thousands of atmospheres wherein the oil has a fluid energy substantially greater than that required to shear such hard materials; providing a discharge nozzle to eject the pressurized oil as a fine, needle-like jet at hypersonic velocity; positioning the material in proximity to the discharge end of said nozzle; applying a needle-like hypersonic jet of oil from said nozzle substantially normally against such material to remove a portion of the same in proximity to the discharge nozzle and substantially instantaneously to shear through the material; and providing relative movement between said nozzle and the material to form an elongated opening through the same.

9. An apparatus as set forth in claim 3 wherein said pressurizing means comprises a pumping system for pressurizing said cutting fluid to at least 50,000 pounds per square inch and the supersonic velocity of said needle-like jet is at least 4,000 ft. per second.

10. The method of cutting hard material by means of a hypersonic jet of a liquid comprising pressurizing the liquid to at least about 100,000 pounds per square inch and supplying the liquid with a fluid energy substantially greater than that required to shear such hard materials; positioning the material in proximity to a fluid nozzle having a discharge orifice therein in the range of from .0025–.008 inch; discharging said fluid hypersonically from said nozzle substantially normally against the material in a thin, needle-like jet having a fluid energy substantially greater than that required to shear the material whereby said fluid jet substantially instantaneously shears through said material.

11. The method of cutting a material by means of a supersonic jet of liquid comprisng positioning the material in proximity to the discharge end of a nozzle; discharging liquid from the nozzle in a needle-like jet of fluid at supersonic velocity; and impinging said supersonic liquid jet against the material to substantially instantaneously shear through a substantial thickness of such material.

12. The method of cutting a material by means of a supersonic jet of liquid comprising positioning the material in proximity to the discharge end of a nozzle; and discharging liquid from said nozzle in a needle-like jet of fluid at supersonic velocity substantially normally against the material to remove a portion of the material in proximity to the discharge nozzle by substantially instantaneously shearing through such portion of the material.

References Cited in the file of this patent

UNITED STATES PATENTS

| | | |
|---|---|---|
| 2,532,655 | Backer | Dec. 5, 1950 |
| 2,666,279 | Chalom | Jan. 19, 1954 |
| 2,774,193 | Thatcher | Dec. 18, 1956 |
| 2,881,503 | Johnson | Apr. 14, 1959 |